United States Patent [19]

Hodgetts

[11] Patent Number: 4,760,971
[45] Date of Patent: Aug. 2, 1988

[54] INTERNALLY MOUNTED DRIVE MECHANISM FOR A BELT-WINDING DRUM

[75] Inventor: Graham L. Hodgetts, Mars, Pa.

[73] Assignee: Rolflor Industries, Inc., Warrendale, Pa.

[21] Appl. No.: 24,719

[22] Filed: Mar. 11, 1987

[51] Int. Cl.⁴ .............................................. B66D 1/14
[52] U.S. Cl. .............................. 242/67.1 R; 254/342; 254/361; 254/362
[58] Field of Search ............... 254/342, 344, 362, 361; 242/67.1 R, 55

[56] References Cited

U.S. PATENT DOCUMENTS

| | | | |
|---|---|---|---|
| 1,146,339 | 7/1915 | Matthews | 254/344 |
| 2,066,779 | 1/1937 | Himmel | 254/342 X |
| 2,540,099 | 2/1951 | Christian | 254/342 X |
| 3,190,617 | 6/1965 | Burrows | 254/342 |
| 4,310,146 | 1/1982 | F'Geppert | 254/342 |
| 4,328,954 | 5/1982 | Logus | 254/344 |

Primary Examiner—John Petrakes
Assistant Examiner—Katherine Matecki
Attorney, Agent, or Firm—Fleit, Jacobson, Cohn & Price

[57] ABSTRACT

An internally mounted rotary drum drive mechanism optimizes the space within a drum by utilizing a rim-mounted, motor-driven rotating gearbox for applying torque to the drum through a split ring-type mounting flange releasably secured between the gearbox and an internal wall of the drum. Radial screws extend through the wall of the drum for releasably attaching the mounting flange and axial screws attach the mounting flange to the gearbox housing. A motor mounting flange locates the motor in driving position adjacent the gearbox and the motor mounting flange is provided with a peripheral notch for obtaining access to the gearbox mounting flange fasteners during assembly and dismantling of the mechanism.

8 Claims, 1 Drawing Sheet

# INTERNALLY MOUNTED DRIVE MECHANISM FOR A BELT-WINDING DRUM

BACKGROUND OF INVENTION

This invention relates to drive systems for rotary drums or rolls used, for example, in driving or winding conveyor belts, flexible floors and the like.

A common requirement in the winding or driving of conveyor belts, flexible floors, and the like, is to provide a drive mechanism which is mounted internally of a drum on which the belt or floor is wound. This requirement is particularly relevant where a conveyor or flexible floor is to be used in a confined space which precludes the use of a drum drive mechanism that projects to any appreciable extent from the end of a drum. For example, in trucks having load beds incorporating a driven loading/unloading conveyor, it is desirable for the conveyor (and also its driving drum) to extend substantially across the entire width of a truck body. In this arrangement, it is necessary for the drum drive to be housed internally within the drum, since Federal requirements preclude the use of a drive mechanism which might project from the side of a truck.

Internally mounted rotary drum drive systems are known, such systems commonly comprising a motor and gearbox assembly accommodated within a cavity within the drum. In one known system, for example, the gearbox housing itself is rotated and forms a drive connection to the drum through a mounting flange permanently attached to the internal circumference of the drum, and to which the gearbox housing is secured by a rim-mounting. With this system, however, to allow removal of the gearbox, the drum diameter may need to be larger than would otherwise be necessary. In another known system, the gearbox has an output shaft providing a rotary drive connection with the drum through an internal drum flange. A stationary gearbox housing is mounted on a further flange which is itself attached to a stationary mounting tube. The tube has an internal diameter larger than that of the gearbox and an external diameter smaller than the internal diameter of the drum. This arrangement requires the internal diameter of the drum to be large enough to accommodate the mounting tube and may also require the use of separate drum bearings, since the configuration requires the gearbox output shaft to be a loose fit in the drum drive flange for removal and replacement purposes.

SUMMARY OF THE INVENTION

It is an object of the invention to provide a novel internally mountable rotary drum drive mechanism which can be readily removed from and replaced within a drum of generally small diameter relative to the size of the drive mechanism thereby minimizing the overall weight of the drum and the torque required to drive same.

A more particular object of the invention is to provide a drive mechanism as aforesaid which uses a rim-mounted rotary gearbox housing for imparting drive to the drum, eliminating the need for a shaft output gearbox and associated mounting tube, and enabling the gearbox bearings to provide support for the drum without total dependence on separate drum bearings.

In fulfillment of the above and other objects, the invention accordingly provides an internally mountable drive mechanism for a rotary drum having an internal cylindrical cavity for accommodating the drive mechanism with a peripheral wall and an access opening at one end of the drum, the drive mechanism including a gearbox having a housing adapted to fit the cavity, ring-like mounting flange means, preferably in the form of a multi-part split flange, the mounting flange means conforming in outside diameter to the diameter of said wall, first fastener means, preferably circumferentially spaced axially extending screws, for releasably attaching the flange means to a surface of the gearbox housing facing the access opening, second fastener means, preferably circumferentially spaced screws extending radially through the drum, for releasably attaching the flange means to the internal wall of the cavity in predetermined axial position, a motor for driving the gearbox in a manner rotating the gearbox housing, and a motor mounting assembly for mounting the motor in drive position in said cavity adjacent one end of the gearbox which faces the access opening. Preferably, the gearbox mounting assembly may comprise a mounting flange for locating the motor adjacent one said end of the gearbox, a reactor tube conforming generally in diameter to the diameter of the cavity, and a length to extend from the motor mounting flange out of the cavity through the access opening, and third fastener means for releasably attaching the reactor tube to the motor mounting flange. Externally of the cavity, adjacent the one end of the drum, the reactor tube may be attached to a stationary ring-like anchor plate or the like.

In accordance with a further important feature of the invention, the motor mounting flange may have an outer diameter substantially conforming to the diameter of the cavity and the periphery of the flange may be notched at a location or locations to be aligned with the first fastener means by suitable rotation of the flange, whereby access is obtained to the first fastener means for tightening and loosening same during assembly and removal of the drive mechanism.

By using a split, multi-part mounting flange (rather than a continuous 360° ring-like flange) for securing the gearbox housing to the inner wall of the drum, securing the flange by radial screws extending through apertures in the drum, and securing the gearbox housing to the flange by circumferentially spaced axial screws, an accurately conforming, tight fitting, yet substantially stress-free mounting of the gearbox in the drum can be obtained by suitable tightening of the respective sets of fasteners. Moreover, the provision of the respective sets of fasteners, along with the notches in the motor mounting flange, enables the system readily to be assembled and dismantled from the access end of the drum without having to make the drum diameter substantially larger than that of the gearbox housing. Other advantages of the system are the ability of the gearbox bearings to support the drum and better integration of the gearbox and motor into the drum allowing smaller more compact gearboxes and motors to be used than in equivalent prior art systems.

Additional features and advantages of the invention will become apparent from the ensuing description and claims read in conjunction with the attached drawings.

DESCRIPTION OF PREFERRED EMBODIMENT

Figure 1:
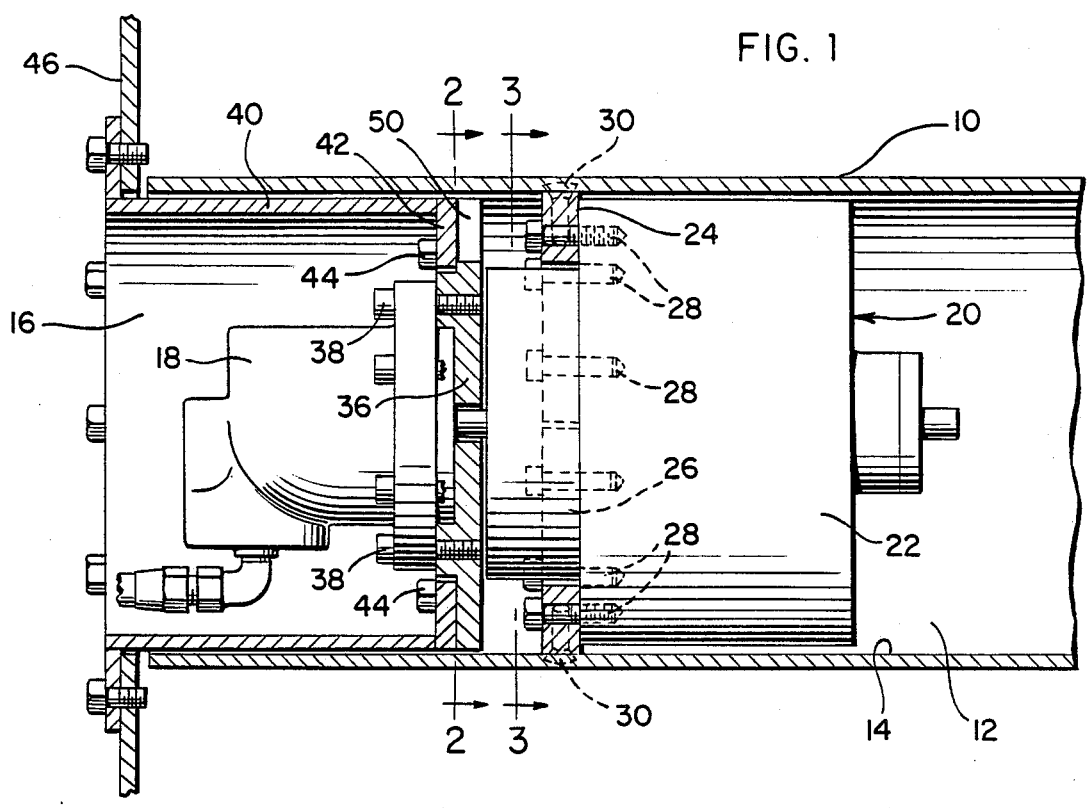
FIG. 1 is a sectional elevational view through a rotary drum for driving or winding a conveyor belt or the like, the drum being equipped with an internally mounted drive mechanism according to the invention.

Referring to the drawings in detail, there is shown a rotary drum 10 which may, for example, comprise a driving or winding drum for a conveyor belt, flexible floor, or the like, not shown. The drum has an internal cavity 12 with a peripheral wall 14, and an access opening 16 into the cavity at one end of the drum. In order, inter alia, to conserve space, particularly at the one end of the drum, the drum is provided with a rotary drive mechanism in accordance with the invention which is mounted internally of the drum in cavity 12, as will be described, and which includes, inter alia, a drive motor 18 and a gearbox 20. The gearbox and motor may be of a generally well-known type and do not, per se, constitute the invention. The motor may, for example, comprise a hydraulic motor as shown, or it may alternatively comprise an electric motor. The gearbox is of the driven-housing type, for example, a "Flangeless FW6" type gearbox, of Fairfield Manufacturing Company, Inc., in which the gearbox housing 22 rotates to drive drum 10 in a manner to be described. A conventional drive connection (not shown) is provided between the motor and an input shaft of the gearbox.

Figure 3:
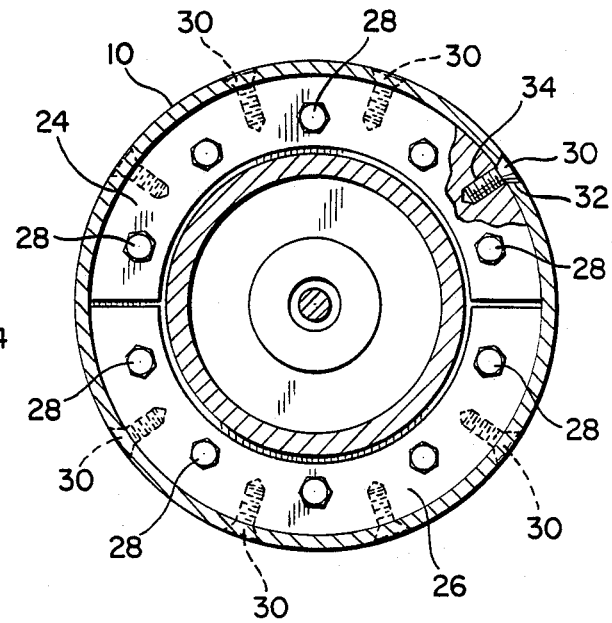
FIG. 3 is a sectional view on line 3—3 of FIG. 1.

The gearbox housing 22 is rim-mounted to the interior of drum 10 by a split ring-like mounting flange structure comprising respective half-rings 24, 26, each having an outer diameter substantially conforming to the diameter of wall 14. The half-rings 24, 26 are releasably secured to a surface of the gearbox housing facing opening 16 by a first set of circumferentially spaced axially extending screws 28, inserted through suitable apertures in the half-rings and tapped holes in the gearbox housing. Further, the half-rings are releasably secured to the inner wall 14 of the drum by a second set of circumferentially spaced radial fastener screws 30 extending through countersunk radial apertures 32 in the drum into tapped radial holes 34 in the half-rings (see FIG. 3) between screws 28. It will be noted that half-rings 24, 26 are secured to the end of gearbox 20 which faces the access opening 16, with screws 28 being accessible from the access opening. It is also evident that gearbox housing 22 may have a diameter approaching that of wall 14.

Figure 2:
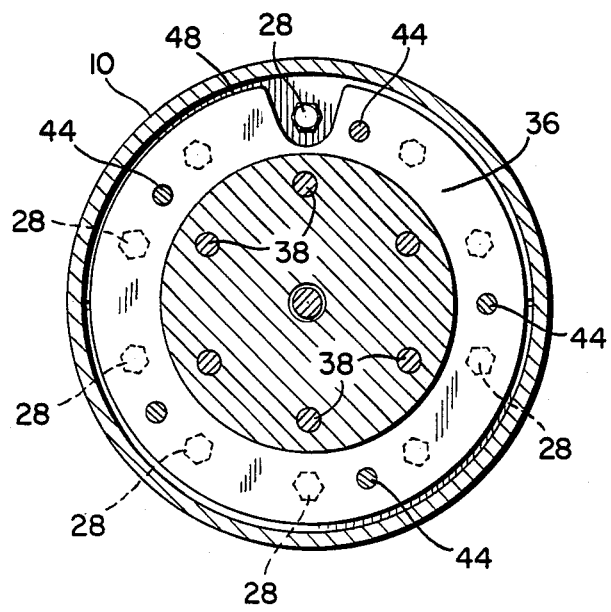
FIG. 2 is a sectional view on line 2—2 of FIG. 1.

Motor 18 is supported adjacent gearbox 20 on a motor mounting flange 36 having an outer diameter similar to that of the gearbox, the motor being attached to the flange 36 in known manner, for example, by fasteners 38. Flange 36 is itself supported by a reactor tube 40 of comparable outer diameter which may, for example, have an internal end flange 42 whereby the tube is releasably connected to flange 36 by further fastener screws 44. Tube 40 extends out of the drum 10 through opening 16, and is attached adjacent the end of the drum to a stationary anchor plate 46 or the like. As best shown in FIG. 2, the motor mounting flange has an outer periphery 48 with a notch 50 which can be aligned with the respective screws 28 (to obtain access to the screws) by suitable rotation of drum 10 when tube 40 is detached. When the tube is attached, the notch is effectively covered by flange 42. While only one notch 50 is necessary, flange 36 could be provided with two or more such notches, spaced around the periphery.

In assembly of the drive mechanism, gearbox 20 is loosely attached to the respective half-rings 24, 26 by screws 28. The gearbox with attached half-rings is then inserted into the drum from the access end, and positioned to align the radial holes 34 in the half-rings with the drum apertures 32. The screws 30 are then inserted and tightened to secure the half-rings to the wall of the drum. The gearbox mounting screws 28 can then be tightened up to secure the gearbox, with access to the screws being obtained through the notch 50 in the motor mounting flange as described. The reactor tube 40 is then attached and secured to anchor plate 42. Dismantling of the drive system may readily be effected by reversing the procedure.

It is evident that the mounting of the gearbox inside of the drum using the removable split mounting flange and dual screw fastener system provides an extremely effective, substantially stress-free firm drive connection between the gearbox and drum, while facilitating assembly and dismantling of the drive mechanism in a drum of minimum diameter. The apparatus herein described accordingly provides an internally mounted rotary drum drive arrangement which is well adapted to fulfilling the objects of the invention.

While only a preferred embodiment of the invention has been described herein in detail, the invention is not limited thereby and modifications can be made within the scope of the attached claims.

What is claimed is:

1. An internally mountable drive mechanism for a rotary drum having an internal cylindrical cavity for accommodating the drive mechanism, said cavity having a peripheral wall and an access opening at one end of the drum, the drive mechanism including a gearbox having a housing adapted to fit the cavity, a plurality of individual part-circular ring segments together defining ring-shaped mounting flange means having an outside diameter substantially conforming to the diameter of said wall, first fastener means for releasably attaching the flange means to a surface of the gearbox housing facing said opening, second fastener means for releasably attaching the flange means to the wall of the cavity in predetermined axial position, a motor for driving the gearbox in a manner to rotate the gearbox housing and thereby apply torque to the drum through said mounting flange means, and a motor mounting assembly for mounting the motor in driving position in the cavity adjacent an end of the gearbox facing said access opening and for supporting the motor from an anchor means externally of the drum adjacent said one end thereof.

2. The invention as defined in claim 1 wherein the flange means consists of two segments in the form of half-rings.

3. The invention as defined in claim 1 wherein the first fastener means comprises a first set of circumferentially spaced axially extending screws connected between the gearbox housing and the respective segments, and wherein the second fastener means comprises a second set of circumferentially spaced radially extending screws inserted in tapped holes in the respective segments through radial apertures in the drum.

4. The invention as defined in claim 1 wherein the motor mounting assembly comprises a motor mounting flange for locating the motor adjacent said end of the gearbox, attachment means between the motor and said flange, a reactor tube, third fastener means for releasably securing an inner end of the reactor tube to the motor mounting flange, and further attachment means between an outer end of the reactor tube and said anchor means.

5. The invention as defined in claim 4 wherein the first fastener means comprises a first set of circumferentially spaced axially extending screws connected between the gearbox housing and the flange means, wherein the motor mounting flange has an outer diameter at least equal to the diameter of a circle on which said screws are located, and wherein the motor mounting flange has a periphery with at least one notch to be aligned with the respective screws for obtaining access to the screws from said access opening.

6. The invention as defined in claim 5 wherein the inner end of the reactor tube has an inwardly directed flange covering said notch and wherein the third fastener means is connected between said inwardly directed flange and the motor mounting flange.

7. The invention as defined in claim 6 wherein the gearbox housing, the motor mounting flange, and the reactor tube are all of comparable outer diameter having minimum clearance with the cavity wall.

8. A rotary belt-winding, belt-driving or like drum having an internal cavity with a peripheral wall, an access opening at one end of the drum, and a drum drive mechanism internally mounted within the cavity, the drive mechanism including a motor/gearbox assembly with a gearbox having a gearbox housing adapted to be rotated by the motor for driving the drum, a multi-part ring-like mounting flange formed of part-circular ring segments releasably secured to one surface of the gearbox housing which faces said access opening by axially extending fasteners disposed on a circle, the mounting flange further being secured to said internal wall of the cavity by radial fasteners extending through radial apertures in the drum, a motor mounting flange adjacent one end of the gearbox housing which faces the access opening for supporting the motor in gearbox driving position, the motor mounting flange having a diameter at least equal to the diameter of said circle and at least one notch in the periphery of the motor mounting flange to be aligned with the axially extending fasteners for obtaining access thereto from said access opening, the mechanism further including a motor reactor tube supporting the motor mounting flange and extending from said access opening for attachment to an anchor means adjacent said one end of the drum.

* * * * *